United States Patent
Beyer

(10) Patent No.: US 7,228,629 B2
(45) Date of Patent: Jun. 12, 2007

(54) METHOD OF SPIN FORMING AN AUTOMOTIVE WHEEL RIM

(76) Inventor: Michael J. Beyer, 6 Sarena, Irvine, CA (US) 92612

( * ) Notice: Subject to any disclaimer, the term of this patent is extended or adjusted under 35 U.S.C. 154(b) by 236 days.

(21) Appl. No.: 10/705,135

(22) Filed: Nov. 10, 2003

(65) Prior Publication Data

US 2005/0097749 A1    May 12, 2005

(51) Int. Cl.
- B60B 21/00 (2006.01)
- B60B 25/00 (2006.01)
- B23P 17/00 (2006.01)

(52) U.S. Cl. .............. 29/894.35; 29/894.351; 29/894.353; 29/894.354; 301/95.101; 301/95.11; 148/696

(58) Field of Classification Search ............ 29/894.35, 29/894.351, 894.352, 894.353, 894.354, 29/894.321, 894.32, 894.322, 894.323, 894.324, 29/894.325, 894.36, 894.361, 894.362; 301/95.101, 301/95.11; 148/691, 692, 693, 694, 695, 148/696, 415

See application file for complete search history.

(56) References Cited

U.S. PATENT DOCUMENTS

| | | | | |
|---|---|---|---|---|
| 1,399,044 | A * | 12/1921 | Bellis | ............... 148/632 |
| 3,478,560 | A * | 11/1969 | O'Brien | ............... 72/257 |
| 3,847,681 | A * | 11/1974 | Waldman et al. | ........... 148/692 |
| 4,035,891 | A * | 7/1977 | Lucas et al. | ........... 29/894.323 |
| 4,579,604 | A * | 4/1986 | Beyer | ............... 148/692 |
| 5,092,040 | A | 3/1992 | Kato et al. | |
| 5,446,962 | A | 9/1995 | Matossian et al. | |
| 5,558,406 | A | 9/1996 | Melbinger et al. | |
| 5,772,801 | A | 6/1998 | Baldi et al. | |
| 5,776,270 | A | 7/1998 | Biondich | |
| 5,794,340 | A | 8/1998 | Pollkotter | |
| 5,902,424 | A * | 5/1999 | Fujita et al. | ............... 148/667 |
| 6,042,662 | A | 3/2000 | Bagard | |
| 6,199,419 | B1 | 3/2001 | Shrayer et al. | |
| 6,244,668 | B1 | 6/2001 | Hale, Jr. et al. | |
| 6,450,583 | B2 | 9/2002 | Hale, Jr. et al. | |
| 6,511,558 | B1 | 1/2003 | Utyashev et al. | |
| 6,536,111 | B1 | 3/2003 | Baumgarten et al. | |
| 6,539,765 | B2 | 4/2003 | Gates | |
| 2002/0139161 | A1 | 10/2002 | Gates | |
| 2004/0066086 | A1 * | 4/2004 | Yoshimura | ............. 301/95.108 |
| 2005/0034305 | A1 * | 2/2005 | Meyer | ............. 29/894.351 |

FOREIGN PATENT DOCUMENTS

| | | | |
|---|---|---|---|
| JP | 06-292932 | * | 10/1994 |
| JP | 08-127851 | * | 5/1996 |
| JP | 08-246116 | * | 9/1996 |
| JP | 09-078210 | * | 3/1997 |
| JP | 2003-236638 | * | 8/2003 |
| WO | 02/051650 | * | 7/2002 |
| WO | 03/002359 | * | 1/2003 |

* cited by examiner

*Primary Examiner*—Jermie E. Cozart
(74) *Attorney, Agent, or Firm*—Fulwider Patton LLP

(57) ABSTRACT

The present invention is directed to a method of manufacturing a three piece aluminum wheel assembly comprising the steps of providing a pair of circular blanks made of a heat treatable alloy to be formed into preforms of a general shape. The preforms are subjected to a quenching step in an unconstrained condition to allow for natural thermal deformation during the quenching operation. The as quenched preforms are then subjected to a first forming operation using spin forming to remove the effects of the thermal deformation in the preform, followed by a second forming step using spin forming to shape the component to its desired final shape. The components are then exposed to precipitation heating and finishing to yield the final product.

12 Claims, 3 Drawing Sheets

METHOD OF SPIN FORMING AN AUTOMOTIVE WHEEL RIM

BACKGROUND OF THE INVENTION

1. Field of the Invention

The present invention relates generally to methods for forming a vehicle rim, and more particularly to a method including the spin forming of a preform of a heat treatable alloy into a simple but controlled shape, followed by solution heat treatment using minimal constraining of the preform that allows for natural thermal deformation, followed by one or more spin forming operations in which the heat treated preform is shaped to the final configuration.

2. Description of Related Art

Aluminum alloy wheels have become a staple for automobile enthusiasts who wish to enhance the appearance of their vehicles. Today, many of the aluminum wheels are formed of three pieces, included two mating halves that form the support rim, plus a centerpiece that includes an aesthetically pleasing design. Three piece aluminum wheels are typically formed by cold working non-heat-treatable aluminum alloys such as 5052 and 5454 in the T0 temper condition. Because of the heat treatment distortion that accompanies the use of higher strength alloys, the trend has been to use cold work alloys that are easier to produce.

Three piece wheels that use cold work alloys have drawbacks such as strength deficiencies in the bolt flange, i.e., the rim half assembly to center. In addition, wheels made from cold worked alloys often suffer from variable strength properties from part to part and from location to location within a particular part. This lack of uniformity must be compensated for by thicker parts that cost more and add unwanted and unnecessary weight to the components. In the racing field, the additional weight can represent a slower overall vehicle. Also, thicker parts can be more difficult to shape requiring more extensive cold working, and thus more expensive to produce than thinner parts. Other limitations of cold worked three piece aluminum wheels include edge cracking which is common during forming and can propagate along the part if undetected.

As a result of these shortcomings, it has been suggested to use one piece aluminum wheels manufactured from higher strength heat treatable alloys such as 6061-T6 for racing applications and the like. The benefit of the higher strength alloys and weight savings overcomes the shortcomings addressed with respect to the cold work alloys referenced above. The heat treatable alloys have higher strength to weight ratios, and allow for deeper, wider parts because they do not work harden as rapidly in the zero condition. Heat treatable alloys are harder and therefore more resistant to denting and scratching of the finished part, which is very important to the consumers who purchase these high end wheels. These alloys can be shaped more easily in the softer, "0" condition and then hardened using one of several types of heat treatment to the harden the product. The strength of such a wheel is more uniform throughout the part, and is less dependent upon a part's width. Heat treated parts achieve full strength across the part's cross section, resulting in a safer product.

The difficulty with the use of heat treatable alloys is that the material experiences both hardening and deformation during the heat solution process, resulting in a deformed part that has been significantly hardened while requiring what may be substantial subsequent shaping as a result of the warping and distorting that the part experiences due to the exposure of very high temperatures used to treat the parts. Because the subsequent step of reshaping the hardened part was expensive and time consuming, this process has been deemed impractical for high production output of aluminum wheels.

It is also known to use a preform to create a one-piece wheel similar to a casting, where the center and rim are made of a single piece of metal. A cast log is severed to yield a billet which is then subjected to a series of hot forging operations to form the wheel center and the rim of the wheel. The hot forging operations are conducted at temperatures in the 850°–900° F. and require multiple steps to achieve the desired preform configuration. Thereafter, the forging is subjected to a trimming operation. It is noted that the forging operation can result in collapsing or deformation of the wheel, particularly where openings or thickness gradients exist in the wheel as might be found in particular esthetics designs or for functional purposes. The one piece wheel is subjected to a solution heat treatment after which final contouring and shaping is performed by additional forming steps. This methodology is described in the inventor's previous patent, U.S. Pat. No. 4,579,604, entitled "Method of Spin Forging a Finished Article" issued Apr. 1, 1986, the disclosure of which is fully incorporated herein by reference.

A byproduct of the forging operation just discussed is the need to constrain the wheel during the solution heat treatment to minimize the thermal deformation. The presence of significant post-thermal deformation requires that the hardened, forged one-piece wheel must be reshaped. However, the solution heat treatment process makes it very difficult and costly to perform constraints on the wheel during the heat treatment process, and thus the process has not heretofore been available to high production wheels.

SUMMARY OF THE INVENTION

The present invention is directed to a method of spin forming (spinning) a three piece automotive wheel rim comprising the steps of providing a pair of circular blanks of a heat treatable material in the T0 condition having a thickness providing for final form volume and final form thickness. The blanks are shaped to a general preform having controlled thicknesses along its length and comprise a disk-shaped component with an annular rim flared radially outward at a curved end portion. The generally shaped preform is then heat treated in a solution heat treatment process during which little or no constraints are placed on the deformation of the preform. After the heat solution treatment, a first spin forming operation removes the deformation from the 'as quenched' (AQ) preform by straightening the warping and distortion, followed by a second spin forming operation of the AQ component to yield the final shape of the rim. The preforms are then subjected to further heating to precipitate the alloy, followed by finishing of the two halves of the rim. The rim halves are combined into a single annular rim component and mated with a centerpiece to complete the three piece wheel assembly.

DETAILED DESCRIPTION OF THE PREFERRED EMBODIMENTS

The wheel of the present invention can be formed of a variety of heat treatable alloys such as aluminum alloys in the 2000, 6000, and 7000 series, as well as other non-ferrous heat treatable alloys, but it has been found to be particularly useful in producing wheels of 6061 aluminum alloy. Aluminum 6061 is particularly suitable because of its higher strength to weight ratio, but heretofore has been generally underutilized due to the difficulty of reworking the material after being subjected to the heat treatment hardening and the resultant thermal distortion. The present invention accounts for the thermal distortion using a unique approach wherein an unforged preform is spin formed into a simple geometric shape having only an annular rim portion that flares radially outward, rather than an approximate of the final shape, and the preform is substantially unconstrained during the heat treat process. The heat treated preform after it has undergone thermal distortion is then spin formed during a first shaping operation to largely remove the warping and distortion visited by the hardening process, followed by a second spin forming operation to create the final shape using a cold working process that can add additional hardness to the alloy. After the final shape has been achieved through spinning, the parts are subjected to a precipitation hardening process before final finishing operations to yield the final product.

Figure 1:
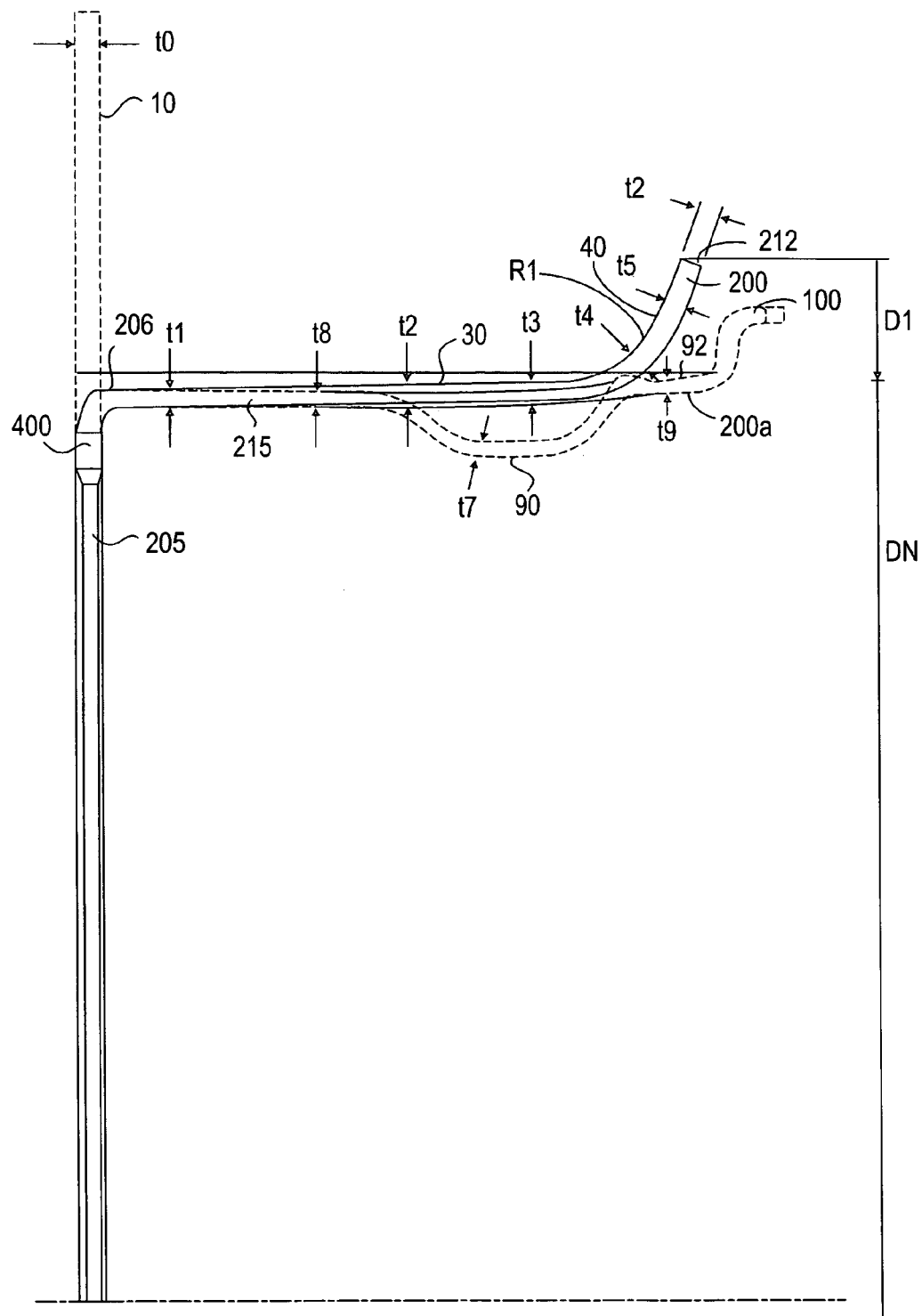
FIG. 1 is a cross-sectional view of a first preform of the present invention with a circular blank and final inner rim half shown in shadow.
Figure 2:
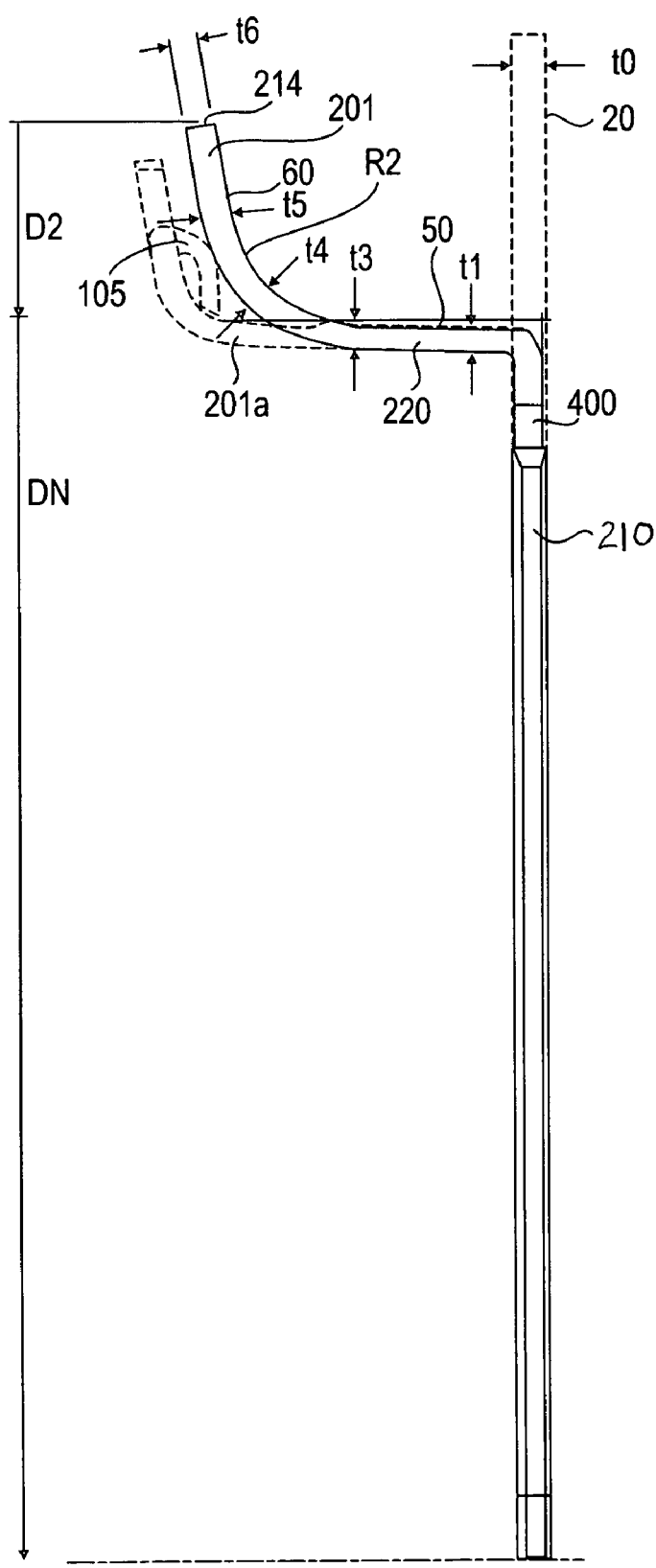
FIG. 2 is a cross-sectional view of a second preform of the present invention with a circular blank and final outer rim half shown in shadow.

The initial step in the process is selecting a pair of circular blanks 10,20 as shown in profile in FIGS. 1 and 2, where the blanks are made of a heat treatable aluminum alloy such as aluminum 6061. Other non-ferrous alloys that are heat treatable may also be used with the present invention. Each blank 10,20 will be used to form one half of the rim portion of the three piece wheel, with a stock centerpiece to be added at a later step. The disk-shaped blanks are preferably provided in the T0 or "0" annealed condition to provide a relatively malleable material suitable for shaping to the desired form, but are capable of being heat solution treated to increase the strength. The thickness of the disk will vary for different wheel applications, but an exemplary thickness for one wheel application is approximately 0.240 inches (thickness t0=0.240). To create the rim portion of the wheel that supports the tire, the two circular blanks are each placed against a chuck having an outer surface shape conforming to the shape of preforms 200,201. The blanks are then stamped or forced against the chuck to create the preforms 200,201 shown in FIGS. 1 and 2. The resultant preforms are thus formed into a circular disk portion 205, 210 and an annular rim portion 215,220 flared radially outward at distal ends 212, 214. In cross-section as shown in FIGS. 1 and 2, the annular rim portions 215,220 thus comprise a straight segment 30,50 and an curved end segment 40,60 at the distal end of the straight segment.

In the prior art, a single one piece preform was created through forging or other expensive and costly mechanical means. Further, the preform was typically shaped into a profile that approximates the final shape of the wheel. This step would be followed by a thermal treatment such as immersing the preform in a heated bath of brine in order to strengthen the wheel and provide hardness to resist dings and dents. However, because the preform was initially shaped into the final form, the heat treatment was performed with constraints to limit the amount of thermal distortion that resulted from the heat treatment process. It had previously been widely held that the increased hardness of the parts after the heat treatment left them too brittle for significant reshaping, and thus the object was to attempt to construct a preform as close to the final product's shape as possible and then minimize the amount of post-treatment cold working through constraint of the wheel during the heating.

The present invention departs from this methodology by developing a preform that does not approximate or conform to the final shape, but rather is formed of a simple geometric construction having an annular rim portion that includes a substantially straight segment 30,50 terminating in a gradually curved end segment 50,60. The preform of the present invention lacks the recesses, curves, flanges, and subtle linear characteristics of the finished wheel in favor of a more general shape that renders any thermal deformation during the heat solution treatment less significant because fine shaping is performed after and not before the quenching operation. That is, by using a general shape for the preform the manufacturer may be less concerned with the amount of thermal deformation during the quenching operation as long as the as quenched component can be formed without undue difficulty to the final shape.

The preforms 200, 201 of the present invention as shown in FIGS. 1 and 2 are formed into the general shape with a reduction in thickness in the straight portions 30, 50 while preferably maintaining substantially the original thickness t0 at the ends of the curved end portions 50, 60 (i.e., t0=t6). If the original thickness is 0.240 inches, the reduced thicknesses t1, t2, and t3 as shown in FIGS. 1 and 2 are approximately twenty-five percent reduced from the original thickness, or 0.180 inches in the example shown. Thicknesses t4 and t5 are transitionary thicknesses such as 0.220 inches and 0.230 inches, respectively, with t6 at the full original thickness of 0.240 inches. The radius of curvature R1 of the curved portion 40 on preform 200 is approximately one and one half inches, and the radius of curvature R2 for the curved end portion 60 on preform 201 is approximately one inch. The deflection D1 of the curved end portion 40 on preform 200 above the nominal rim diameter DN is approximately two and one half inches, while the deflection D2 of the curved end portion 60 on preform 201 above the nominal rim diameter DN is approximately three inches.

The two preforms 200,201 have radius of curvatures in the curved end portions 40,60 of approximately 6:1 and 4:1, respectively, compared with the original thickness t0 of the blanks. The deflection D1, D2 of the curved end portions 40,60 of the preforms 200,201 with respect to the nominal rim diameter DN is approximately 12:1 and 10:1, respectively, compared with the original thickness t0 of the blanks. The reduced thickness t1, t2, t3 of the straight portions 30, 50 enable more flexibility in the as quenched condition and the present shape of the preform has been found to react favorably during the heat treatment process and facilitate final shaping of the wheel halves.

The two preforms 200,201 are then quenched in a molten salt bath or other quenching operation using minimal constraining of the preforms to achieve a T4 temper condition. That is, the preforms are allowed to undergo thermal deformation in a substantially unconstricted environment rather than limit the amount of the deformation using racks or other means of constraint. The elimination of constraining mechanisms during the quenching step significantly simplifies the heat solution treatment step and dramatically lowers the cost and complexity of the heat treatment step, making the present invention much more suitable for production level manufacturing than previously thought impossible.

Quenching temperatures range from 985° F. to 995° F. for 6061 alloy, and is generally governed by Aerospace Material Specification (AMS) 2770G, incorporated herein by reference. In the example provided above, the preform halves are quenched for approximately thirty-five minutes in a salt and fluidized bed to achieve a T4 temper condition. At the temperatures used, soluble constituents in the fluid bath enter into the metallic matrix and are retained in a supersaturated state after quenching. The constituent here may be a polymer or salt that is dissolved in the bath and its introduction into the alloy forms a stronger part.

After the part is quenched in the heat solution treatment, thermal deformation will have caused the preforms to warp and deflect similar to the shape of a potato chip, particularly around the annular rim portions that form the support for the tire. In the present invention the absence of significant constraining mechanisms during the quenching operation will result in greater deformation than in prior methods for heat treatable alloys. Using post-heat treatment spin forming, it has been discovered that the AQ preform is not too brittle to reshape using spin forming to reshape the part, and it is also believed that the additional shaping of the AQ part using the spin forming technique adds a measure of incremental hardness to the wheel. The minimal shape and thickness of the preforms allow for dimensional, thickness, shape, and run-out control critical to the net formed part.

After the heat solution treatment, to remove the warping of the preforms they are mounted and clamped between a chuck and tail stock, where the chuck has an external contoured surface that generally conforms to the original shape of the preform for each particular wheel half. Once clamped, the AQ wheel halves are then rotated and another spinning metal roller having a round peripheral edge is advanced and forced into engagement with the wheel half, and generally moved in an axial direction across the straight and curved portions of the preform such that the preform is pressed into the shape of the chuck. Using multiple passes of the roller, the preform gradually is spin formed into a radially symmetric annular component that can approximate the original pre-treatment shape or can be a shape that facilitates the subsequent shaping step to produce the final rim shape of the finished product. The importance of this step, however, is to remove the anomalies and warping that results from the quenching process so that a radially symmetric preform can be spin formed into the final shape.

A second AQ forming step is then performed using the spin forming technique to create the shape of the final wheel rim. Inner wheel half 200a is formed with a drop center 90 and a second linear segment 92 proximate to the axial flange 100 as shown in FIG. 1. The thickness t7 of the drop center 90 is approximately two thirds the original thickness t0 of the preform, or approximately 0.140–0.150 inches in the example. The portion of the inner rim half 200a between the drop center 90 and the proximal end 206 has a thickness t8 of approximately 0.160 and the thickness t9 distal to the drop center 90 is approximately 0.130 in the finished part. The control exercised by the first AQ forming operation (restoring thermal deformation) in combination with the controlled thicknesses of the preform allow the second AQ forming operation (final wheel shaping) to be accurately controlled. Further shaping occurs to create the axial flange 100 on rim inner half 200a, as well as the retaining bead 105 on outer rim half 201a.

Figure 4:
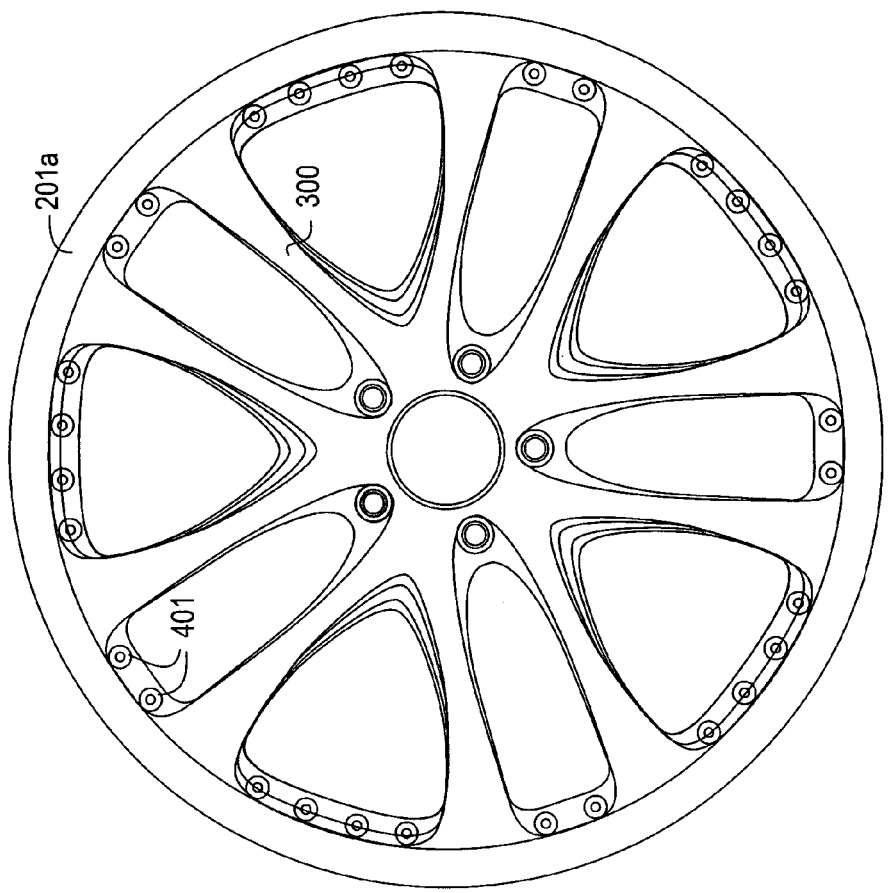
FIG. 4 is a front view of an exemplary three piece wheel formed of the method of the present invention.
Figure 3:
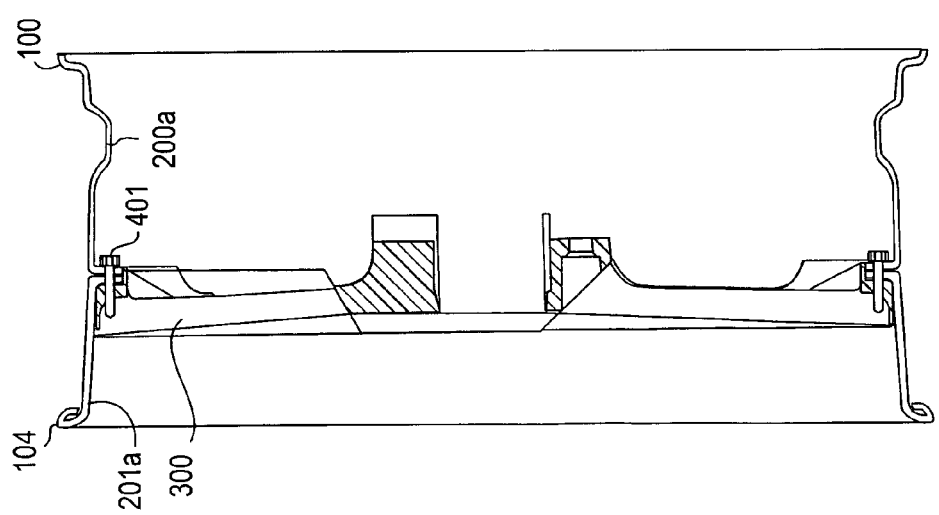
FIG. 3 is a cross-sectional view of the three piece wheel assembly showing the inner and outer rim halves of FIGS. 1 and 2.

After the rim halves 200a, 201a have undergone the first and second AQ spin forming operations, they are subjected to precipitation heat treatment at approximately 350° F. for eight hours to achieve a T6 temper condition. This further hardens the alloy and provides strength and resistance to marring, denting, and scratching. After the precipitation heating, the rim halves are cooled and aged, and then bolt holes 400 are formed in the radial portion 205, 210 of the rim halves 200a, 201a to allow the two rim halves to be bolted together. The bolting of the two rim halves will typically also include the attachment of a centerpiece 300 completing the three piece wheel configuration. FIG. 3 illustrates the attachment of the two rim halves 200a, 201a and the centerpiece 300 into a single three piece vehicle wheel assembly. The radial portions 205, 210 of the rim halves 200a, 201a are usually removed below the bolted section to reduce weight of the wheel, and the end flanges are ordinarily trimmed after precipitation heating. Rivets or bolts 401 are inserted through bolt holes 400 on each wheel half 200,201, and the bolts also pass through complimentary bolt holes on the outer periphery of the attached centerpiece to connect the centerpiece to the rim halves 200a, 201a. FIG. 4 illustrates an example of a completed three piece wheel with the centerpiece bolted to the rim as shown.

The invention described above is suitable for many types of heat treatable alloys, including magnesium alloys and aluminum alloys particularly suited for quenching operations. Moreover, while the reduction in the thickness of the preform prior to quenching facilitates post-quenching restoring of the preform, various shapes for the preform may also be suitable in addition to those discussed in connection with the embodiments described above. Moreover, it is possible to combine the spin forming steps after the quenching operation into a single step wherein the thermal deformation is removed simultaneously with the final shaping of the wheel halves. Accordingly, the above description is deemed to be illustrative of the present invention, but the present invention is not limited to the above described embodiments. Rather, the invention contemplates those variations and substitutions that would be obvious to one of ordinary skill in the art. The present invention should not be limited to the described embodiments but rather only by the words of the claims appended below.

What is claimed is:

1. A method of making a three-piece vehicle wheel assembly comprising:

providing first and second circular blanks of an aluminum alloy selected from a group comprising two thousand series, six thousand series, and seven thousand series;

forming without a casting or forging process the first and second circular blanks into first and second preforms, said first and second preforms having a disk-shaped component with a circumferential perimeter, and an annular rim portion extending axially at the circumferential perimeter of the disk-shaped component, the annular rim portion including a radially outwardly flared distal end portion and the preforms having a shorter axial length than a length of a finished rim;

subjecting the first and second preforms to a quenching operation to harden the preforms, said quenching operation conducted so as to allow unhindered thermal deformation of the first and second preforms;

forming the first and second preforms in the as quenched state in a first forming operation to return the first and second preform to a radially symmetric condition;

forming the first and second preforms in the as quenched state in a second forming operation to shape the preforms into inner and outer halves of a wheel rim, including the formation of a drop center and retaining bead; and coupling the inner and outer halves of the wheel rim together with a centerpiece to complete the three piece assembly.

2. The method of claim 1 further comprising selecting the preforms of Aluminum 6061 alloy.

3. The method of claim 1 further comprising subjecting the first and second preforms in the as quenched condition after the second forming operation to precipitation heating.

4. The method of claim 1 further comprising providing the circular blanks in the T0 temper condition, and heating the preforms in the quenching operation to produce a T4 temper condition.

5. The method of claim 4 further comprising subjecting the preforms to a precipitation heating step to achieve a T6 temper condition.

6. The method of claim 1 wherein the quenching operation is achieved in a heat solution treatment wherein the preforms are immersed in a heated salt bath.

7. The method of claim 1 wherein the forming operations after quenching is conducted using a spin forming operation.

8. The method of claim 1 wherein the radially outward flared distal end portion of the first and second preforms have a radius of curvature of approximately 4:1 to 6:1 compared with an original thickness of the circular blank.

9. The method of claim 1 wherein the annular rim portion of the first and second preforms are reduced in thickness during the shaping of the preform.

10. The method of claim 9 wherein the reduction in thickness of the preform at the annular rim portion is approximately twenty-five percent of the original thickness of the circular blank.

11. The method of claim 1 wherein the radially outward flared distal end portion of the first and second preforms extend above a nominal rim diameter to a distance at least ten times the original thickness of the circular blank.

12. The method of claim 1 wherein a distal end of the radially outward flared distal end portion is no thicker than the original thickness of the circular blank.

* * * * *